Patented Jan. 24, 1950

2,495,260

UNITED STATES PATENT OFFICE 2,495,260

3-ARYLBENZOTHIAZOLIUM QUATERNARY SALTS AND PROCESS FOR PREPARING THE SAME

Jacob Josef Jennen, Antwerp, Belgium, and Walter Michaelis, deceased, late of Hollywood, Calif., by Hella Michaelis, administratrix, Hollywood, Calif.; said Jacob Josef Jennen and Walter Michaelis, assignors to Béla Gaspar No Drawing. Original application May 17, 1940, Serial No. 335,854. Divided and this application April 25, 1944, Serial No. 532,694. In Great Britain April 24, 1939

7 Claims. (Cl. 260—304)

This application is a division of our application Serial No. 335,854, filed May 17, 1940.

The present invention relates to dyes, belonging to the class of methine and polymethine dyes and dyes of similar structure and more particularly to dyes which are useful as sensitizers for photographic silver halide emulsions. These dyes are widely employed in the art of photography and color photography and a great number of cyanine dyes, isocyanine dyes, pseudocyanine dyes, carbocyanine dyes and polymethine dyes having longer methine chains are already known. These dyes are quaternary salts derived from cyclic ammonium bases in which there is a pentavalent nitrogen atom single bound to one neighbouring ring atom and double bound to the other neighbouring ring atom of a hetero-cyclic ring whilst the fourth valency of the same nitrogen atom is linked to a hydrocarbon radical, the fifth valency of the nitrogen atom being in ionogene linkage with an anion.

The present invention relates to the manufacture of methine dyes and polymethine dyes in which the hetero-cyclic ring includes both a nitrogen atom and another hetero-atom such as sulphur and in which the fourth valency of the nitrogen atom is linked not to an aliphatic but to a cyclic carbon atom and to photographic silver halide emulsions sensitized with such dye or dyes. Whereas the formulae of sensitizing dyes have been drafted sometimes broad enough to include a cyclic substituent at the nitrogen atom, it does not appear that those dyes and more particularly sensitizing thiazole dyes carrying such substituents have been prepared or used in light-sensitive emulsions. The dyes can be prepared by treating N-arylated quaternary salts of a heterocyclic nitrogen base, the ring atom of which includes another hetero-atom such as sulphur and which carries a methyl group in ortho position to the cyclic nitrogen atom (or the corresponding methylene bases) by the methods known to be capable of converting hetero-cyclic nitrogen bases containing a reactive methyl group in α-position to a cyclic nitrogen atom (or the corresponding methylene bases) into dyes of the following general formula:

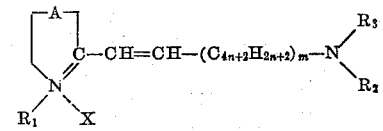

in which the hydrogen atoms may be substituted. In the above formula:

A is a hetero atom other than a nitrogen atom in an atom chain of a ring system;

$R_1$ is a hydrocarbon radical;

X is an anion;

$n$ is zero and $m$ is zero, 1, 2 or 3, or $n$ and $m$ are 1;

$R_2$ is a hydrocarbon radical;

$R_3$ is a hydrocarbon radical, an atom chain including three atoms which close a 5-membered hetero ring with a carbon atom of the chain of carbon atoms between the two nitrogen atoms, or an atom chain including two or four atoms which close a 6-membered hetero ring with a carbon atom of the chain of carbon atoms between the two nitrogen atoms, so as to form a dye having two hetero-cyclic nitrogen compounds linked by an odd number of carbon atoms.

In the following examples, some of the known methods for producing dyes of the above general formula are applied to the treatment of the N-arylated quaternary salts, the term "N-arylated quaternary salts" being intended to include also compounds in which cyclic radicals other than aromatic aryl radicals are linked to the nitrogen atom.

*Example 1.*—1 gram of 2.4-dimethyl-3-phenyl-thiazolium iodide (prepared according to the Journal of the American Chemical Society, 1935, page 1881, or to Berichte der Deutschen Chemischen Gesellschaft, vol. 69/1, page 221) and .5 grm. of p-dimethylaminobenzaldehyde are dissolved by warming in 7 ccs. of ethyl alcohol. .17 grm. of piperidine are then added, and the mixture is refluxed for an hour.

After cooling, ether is added, and thereupon an orange-red dye separates out, which is dissolved by heating in a little ethyl alcohol. On cooling this solution, crystals with greenish lustre are formed. The dye, dissolved in water with the addition of a small quantity of methyl alcohol has an absorption maximum at about 485 μμ. Its formula is probably that of the 2-dimethylamino-styryl-3-phenyl-4-methylthiazolium iodide:

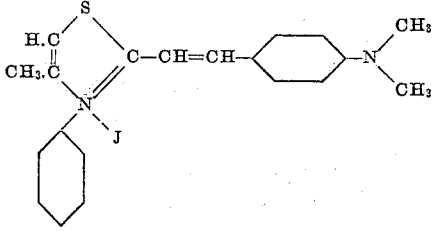

A silver halide emulsion layer is sensitized to green light by the addition of the dye and then shows a maximum of sensitivity at about 450 μμ and another maximum at about 540 μμ.

Example 2.—3 grms. of the 2.4-dimethyl-N-phenyl-thiazolium iodide are heated with 3 grms. of N-methyl-α-thioquinolone-methyl-iodide and 30 ccs. of dry pyridine in an oil bath at 120° C. for 1½ hours. The addition of water to the cooled mixture results in the precipitation of a dye, having an absorption maximum in a methyl-alcoholic solution at about 482 μμ. Its formula is probably that of the 1'-methyl-3-phenyl-4-methyl-thiazolo-pseudo-cyanine iodide:

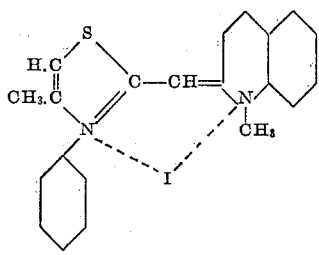

Example 3.—3 grms. of the 2.4-dimethyl-3-phenyl-thiazolium iodide and 40 ccs. of dry pyridine are refluxed 1½ hours together with 5 ccs. ethyl-ortho-acetate. The addition of ether causes the precipitation of a magenta dye, crystallizable from ethyl alcohol, and having in methyl alcoholic solution an absorption maximum at about 548 μμ. Its formula is probably that of the 3.3-diphenyl-4.4'-7-tri-methyl-thiazolo-carbocyanine iodide:

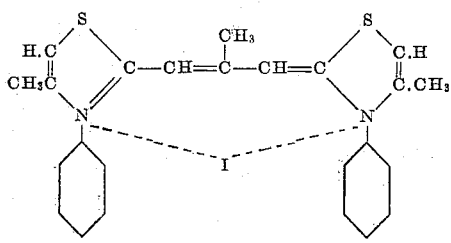

Example 4.—4 ccs. of dry pyridine, .3 grm. of 2.4-dimethyl-3-phenyl-thiazolium iodide and .5 cc. of ortho-formic acid ethyl ester are heated at about 120° C. for about two hours. A magenta dye is obtained which can be precipitated from the solution by the addition of ether. The dye is probably the 3.3'-diphenyl-4.4'-dimethyl-thiazolo-carbocyanine iodide of the formula:
Absorption (maximum) in methyl-alcoholic solution ca. 560 μμ.

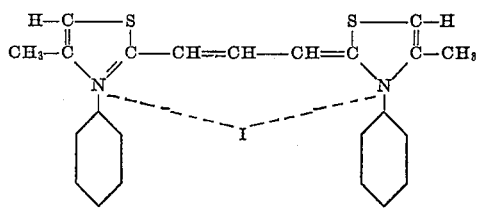

Example 5.—3 grms. of dry p-chloro-thioacetanilide and 3 ccs. of chloroacetone are heated for about 10 minutes on a water bath. 50 ccs. ether are then added to the mixture and the whole is allowed to stand for several hours. The ether is decanted and the excess of chloro-acetone is removed by washing with ether. The raw product is heated for about 8 hours with 4.4 grms. ethyl toluenesulphonate and dissolved thereafter in 10 ccs. of dry pyridine. This solution is boiled with 3 ccs. orthoformic acid ethyl ester for about 45 minutes; after the addition of ether the solution is allowed to stand for several hours, preferably at 0° C. The liquid is decanted and the residue dissolved in methanol and precipitated again with ether. This may be done several times, whereafter the product is boiled with water and filtered. Green crystals of a metallic lustre are obtained, which are believed to be the 3.3'-di-(p - chloro - phenyl) -4.4'-dimethyl-thiazolocarbocyanine toluene-sulphonate of the formula:

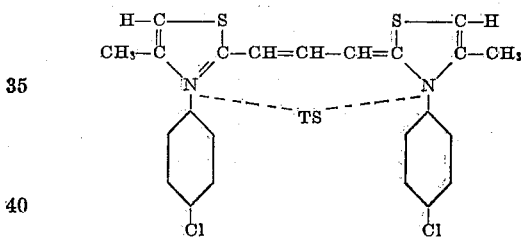

Absorption in methylalcoholic solution ca. 560 μμ (max.).

Example 6.—12.5 grms. acetyl-diphenylamine are dissolved in 50 ccs. pyridine, 6 grms. phosphorus pentasulphide are added and the whole is stirred for 12 hours at 110° C. The upper light yellow layer is decanted off and the thioamide contained therein is precipitated with hydrochloric acid, filtered off by suction and re-crystallized from alcohol. The compound which has a melting point of 112° C. is identical with the thioacetyl diphenylamine prepared by Bernthsen from carbon disulphide and diphenyl acetamidine (Annalen der Chemie, vol. 192, page 39).

6.8 grms. of the thioacetyl diphenylamine thus obtained are dissolved in 30 ccs. chloroform and a solution of 4.8 grms. bromine in 10 ccs. chloroform is added in drops, the whole being cooled during this operation. The light yellow color of the solution changes to a dark brown and meanwhile hydrobromic acid is formed. After the mixture has been allowed to stand for two hours the chloroform is distilled off. The base is dissolved in acetone, freed of an undissolved grey powder by filtering off this by-product; and the acetone is evaporated. A brown oil remains and this is dissolved in 50 ccs. acetic anhydride. Thereupon, 5 ccs. triethyl-ortho-formate are added and the whole is refluxed for 20 minutes. After cooling, 500 ccs. diethyl ether are added, the solution is kept in ice water for about 12 hours and then the precipitated dye is filtered off and washed with ether. It is believed to be 2.2'- diphenyl-thio-carbocyanine acetate and the reaction is believed to proceed as follows:

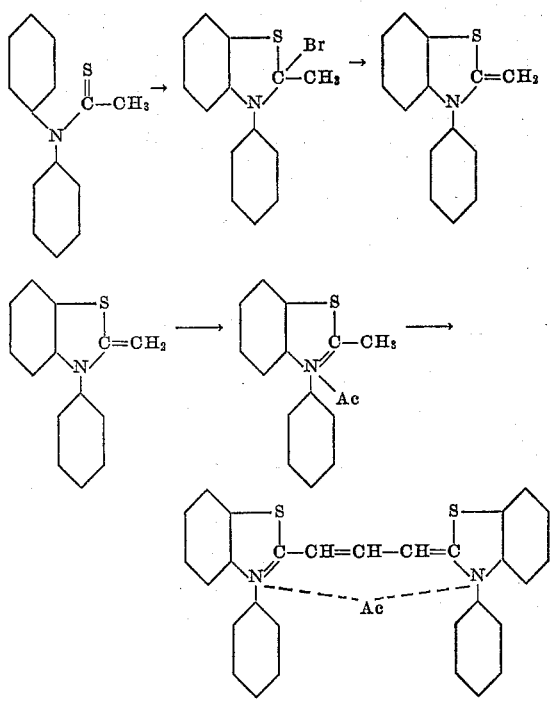

The dye is purified by being dissolved in methyl alcohol and is thereafter converted into the iodide by the addition of a warm 10% potassium iodide solution. The formula of the final dye, whose solution in methyl alcohol shows a maximum absorption at about 565 μμ is believed to be as follows:

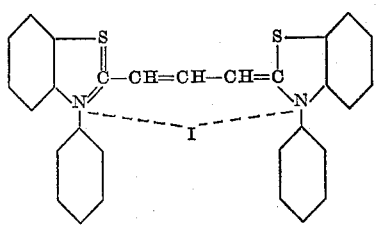

As will be seen from the above formulae the nitrogen atom in at least one of the hetero-cyclic rings of the dye molecule is linked to a phenyl group. By the use of appropriate starting materials, such as the N-thio-acetyl compounds derived from naphthylamine, p-iodoaniline, aminopyridine first converted by condensation with chloro-acetone into N-substituted 2.4-dimethyl-thiazolium salts and by using these compounds in the process instead of 2.4-dimethyl-N-phenyl-thiazolium iodide employed in the above examples, there are obtained dyes that contain various cyclic radicals, substituted or unsubstituted, linked to the nitrogen atom of the hetero-cyclic ring.

It will be understood that instead of the symmetrical carbocyanine dyes unsymmetrical dyes may be prepared and it should further be understood that the reference to certain dyes in the examples is not intended to exclude similar dyes, such as isocyanine dyes, merocyanine dyes and polymethine dyes having a longer polymethine chain. Merocyanine dyes may be prepared, for example, by refluxing for about 20 minutes a solution of .96 grm. 2,4-dimethyl-3-phenyl-thiazolium iodide and .45 grm. diphenyl formamidine in 5 ccs. acetic anhydride, separating the 2-acetanilidovinyl-3-phenyl-4-methyl thiazolium iodide from the cooled solution and condensing the product with rhodanines, pyrazolones and the like as follows:

A solution of .17 grm. acetanilidovinyl-phenyl-methyl thiazolium iodide and .08 grm. 3-phenyl-rhodanine in 2 ccs. absolute ethylalcohol to which about .1 cc. triethylamine has been added, is refluxed for about 20 minutes and then kept for several hours at a temperature of 0° C. The crystals of the dye formed are washed with ether. The dye which is believed to be the 3-phenyl-5 (3-phenyl-4-methyl-2-thiazolylidene-ethylidene) rhodanine has its absorption maximum at about 530 μμ. If instead of the phenyl-rhodanine .07 grm. 1-phenyl-3-methyl-pyrazolone-(5) are used a dye is obtained which is precipitated from the solution by ether and which is washed with ether. The dye which is believed to be the 3-methyl-1-phenyl - 4 - (3 - phenyl-4-methyl-2-thiazolidene-ethylidene) pyrazolone-(5) has its absorption maximum at about 480 μμ.

The dyes may be incorporated in a silver halide gelatin emulsion by bathing the emulsion coating in an alcoholic or aqueous alcoholic dye solution. Or the dyes may be incorporated in the emulsion, preferably into the finished emulsion before coating the same on the plate, film, paper or other support. For example, to a silver bromide-iodide gelatin emulsion which has a silver content corresponding to 60 grms. silver nitrate per kilo emulsion and which has a speed of about 29° Sch. there is added a 1% ethylalcoholic solution of the sensitizing dye. 20 ccs. dye solution per kilo emulsion are used. The emulsions are then coated.

The sensitizing effect of the dyes is illustrated by the spectrograms of the accompanying drawing. In Fig. 1 the spectrograms of two dyes which carry a cyclic substituent at the nitrogen atom and which are prepared according to the preceding Examples 4 and 5 are shown in comparison with the spectrogram of the corresponding N-alkyl compound. In Fig. 2 the absorption curves of these three dyes are shown. Fig. 3 shows the spectrogram of another N-arylated dye, prepared as described in Example 1. Fig. 1 illustrates the improvements obtainable by the introduction of a cyclic substituent into the dye molecule and the effect of substituents, such as chlorine, present in said cyclic radical. The choice of suitable substituents does not offer particular difficulties, as the more or less favorable influence on the sensitizing properties is, in general, known for the substituents usually employed.

A polymethine dye having a polymethine chain including more than three carbon atoms may be prepared by heating for about 5 minutes .32 grm. 2.4 - dimethyl-3-phenylthiazolium iodide with .14 grm. glutaconic dialdehyde dianilide and .22 cc. triethylamine in 4 ccs. absolute ethylalcohol, until the solution has become blue-green. The dye crystallizes from the solution kept at low temperature for several hours.

What we claim is:

1. A process for preparing a cyclammonium quaternary salt comprising oxidizing, with a halogen, an N,N-diarylthioamide in which the aryl groups contain a hydrogen atom attached to the aryl nucleus in at least one of the positions ortho to the amide nitrogen atom.

2. A process for preparing a cyclammonium quaternary salt comprising oxidizing with bromine an N,N-diarylthioamide in which the aryl groups contain a hydrogen atom attached to the aryl nucleus in at least one of the positions ortho to the amide nitrogen atom.

3. A process for preparing a cyclammonium quaternary salt comprising oxidizing, with a halogen, an N,N-diphenylthioamide in which the phenyl groups contain a hydrogen atom attached to the phenyl nucleus in at least one of the positions ortho to the amide nitrogen atom.

4. A process for preparing a cyclammonium quaternary salt comprising oxidizing with bromine an N,N-diphenylthioamide in which the phenyl groups contain a hydrogen atom attached to the phenyl nucleus in at least one of the positions ortho to the amide nitrogen atom.

5. A process for preparing a cyclammonium quaternary salt comprising oxidizing, with a halogen, an N,N-diphenylthioacetamide in which the phenyl groups contain a hydrogen atom attached to the phenyl nucleus in at least one of the positions ortho to the amide nitrogen atom.

6. A process for preparing a cyclammonium quaternary salt comprising oxidizing with bromine an N,N-diphenylthioacetamide in which the phenyl groups contain a hydrogen atom attached to the phenyl nucleus in at least one of the positions ortho to the amide nitrogen atom.

7. A 2-methyl-3-phenylbenzothiazolium quaternary salt of the following formula:

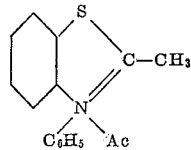

wherein Ac represents an acid radical.

JACOB JOSEF JENNEN.
HELLA MICHAELIS,
Administratrix of the estate of Walter Michaelis, deceased.

No references cited.